US006635608B1

(12) United States Patent
Mogridge

(10) Patent No.: US 6,635,608 B1
(45) Date of Patent: *Oct. 21, 2003

(54) INTERIOR TEXTURED COATING REMOVER COMPOSITION

(76) Inventor: Ithiel Mogridge, 270 North Road, South Gloucestershire, Yate (GB), BS37 7LQ (*) Notice: Subject to any disclaimer, the term of this patent is extended or adjusted under 35 U.S.C. 154(b) by 0 days.

This patent is subject to a terminal disclaimer.

(21) Appl. No.: 09/445,654

(22) Filed: Dec. 10, 1999

Related U.S. Application Data

(63) Continuation of application No. PCT/GB98/01710, filed on Jun. 12, 1998.

(30) Foreign Application Priority Data

Jun. 12, 1997 (GB) .............................................. 9712193

(51) Int. Cl.[7] .............................. C11D 1/02; C11D 3/26; C11D 3/43; C11D 3/44
(52) U.S. Cl. ..................... 510/206; 510/210; 510/212; 510/366; 510/433; 510/488; 510/499; 510/500; 510/501; 510/506
(58) Field of Search ................................. 510/200, 201, 510/206, 210, 212, 366, 433, 488, 499, 500, 501, 506

(56) References Cited

U.S. PATENT DOCUMENTS

| | | | | |
|---|---|---|---|---|
| 4,692,263 A | | 9/1987 | Eberhardt et al. ............ 252/122 |
| 5,006,279 A | * | 4/1991 | Grobbel et al. ............... 252/542 |
| 5,049,314 A | * | 9/1991 | Short ............................ 252/542 |
| 5,106,525 A | * | 4/1992 | Sullivan ....................... 252/162 |
| 5,167,853 A | * | 12/1992 | Stevens ........................ 252/162 |
| 5,811,383 A | * | 9/1998 | Klier et al. ................... 510/417 |
| 6,030,936 A | * | 2/2000 | Lu et al. ....................... 510/424 |
| 6,046,148 A | * | 4/2000 | Toussaint et al. ............ 510/235 |
| 6,048,834 A | * | 4/2000 | Drapier et al. ............... 510/417 |
| 6,066,606 A | * | 5/2000 | Lu et al. ....................... 510/101 |
| 6,071,867 A | * | 6/2000 | Purcell et al. ................ 510/174 |
| 6,106,774 A | * | 8/2000 | Monticello et al. ........... 422/28 |
| 6,110,295 A | * | 8/2000 | Lu et al. ........................ 134/42 |
| 6,150,318 A | * | 11/2000 | Silvester et al. ............. 510/284 |

FOREIGN PATENT DOCUMENTS

| | | |
|---|---|---|
| EP | 0604372 | 12/1993 |
| GB | 2271999 | 5/1994 |

OTHER PUBLICATIONS

McCutcheon's; Emulsifiers adn Detergents, vol. 1, p. 151 (1995).*

* cited by examiner

*Primary Examiner*—Gregory Delcotto
(74) *Attorney, Agent, or Firm*—Volpe and Koenig, P.C

(57) ABSTRACT

The invention relates to plaster type interior textured coating remover composition in the form of an aqueous solution containing at least one alkoxy ether solvent, an alcohol containing from 1 to 6 carbon atoms, at least one nitrogen containing compound, and a compound having an HLB of from 7.3 to 15.0.

14 Claims, No Drawings

INTERIOR TEXTURED COATING REMOVER COMPOSITION

CROSS REFERENCE TO RELATED APPLICATIONS

This application is a 371 of International Application PCT/GB98/01710 designating the United States which was filed on Jun. 12, 1998.

The present invention relates to plaster type interior textured coating removing compositions. More particularly, it relates to a composition containing one or more alkoxy ether solvents and a low molecular weight alcohol with a blend of surfactants for use in removing painted, textured, plaster type interior coatings from a substrate surface or for removing asbestos lagging. Interior textured coating removing compositions which are effective and safe to use generally and on overhead surfaces have been sought for some time. Previously, the methods for removing such coatings have been sanding off, steaming off or chipping off. When sanding down a whole wall or ceiling, much dust is generated, the whole house is affected. Much time and effort is expended. A huge cleaning up operation is then needed. If it was necessary to hire a sander, this would add significantly to the cost of the exercise. When interior textured coatings are removed by steaming, very often the underlying plaster is damaged. This means that in addition to the cost of hiring the steamer, it is necessary to pay to have the wall replastered prior to further redecoration. Much time and effort is expended by this method. If the chosen method is to manually chip away at the interior textured coating, this is cheaper than hiring a steamer or a sander, but is very slow and laborious. Depending on the care being exercised, some damage to the underlying plaster may be caused. In some cases, older type interior textured coatings contain asbestos fibres. Such fibres are well known to be extremely hazardous to health and if coatings containing asbestos fibres in the United Kingdom are to be removed by paid tradespersons this work has to be undertaken by a licensed contractor. United Kingdom law requires that power tools are not used in the removal of asbestos-containing coatings since such use increases the risk of fragmentation of the hazardous fibres which would produce a multiplied risk of fibre inhalation. For this reason, interior textured coatings containing asbestos have to be manually chipped away to minimize the creation of hazardous fibre-containing dust and to facilitate safe disposal of the material.

The interior textured coating removing composition of the present invention provides a safe, easy to use solution to a common problem. In particular, it softens and hydrates plaster type interior textured coating residues without being corrosive, harmful or irritant to living tissue and within a timescale which would be acceptable to any user, whether trade or homeowner. Also, the underlying plaster will not be damaged. Hence the use of this interior textured coating remover will be quicker, safer and more convenient than any of the other methods which are currently in use. The composition of the present invention can be injected into asbestos fibre-containing coatings (asbestos lagging) to bring about rehydration of the lagging and facilitating wet removal of the fibre-containing material so suppressing the creation of hazardous asbestos-containing dust.

The present invention provides a plaster type interior textured coating remover composition comprising an aqueous mixture, i.e. a solution, of (A) at least one alkoxy ether solvent;

(B) an alcohol containing from 1 to 6 carbon atoms;

(C) at least one nitrogen-containing compound selected from (i) compounds having the general formula I

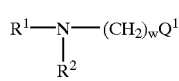  (I)

wherein $R^1$ is H or group of the formula

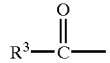

where $R^3$ is a straight or branched chain 6–22 C alkyl or alkenyl group; $R^2$ is H, or methyl or ethyl; w is 1 or 2; and $Q^1$ is —COOM$^1$ or —SO$_3$M$^1$, in which $M^1$ is an alkali metal cation or an optionally substituted ammonium group;

(ii) compounds having the general formula II

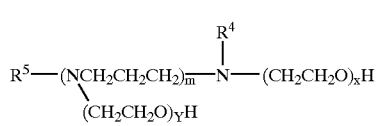  (II)

wherein $R^4$ is H or —(CH$_2$CH$_2$O)$_z$—H; $R^5$ is a straight or branched chain 6–22 C alkyl or alkenyl group; m is 0 or 1; and each of x, y, and z is an integer wherein the total number of (CH$_2$CH$_2$O) groups is in the range of from 2 to 50;

(iii) an imidazoline compound of the formula III

  (III)

wherein R is a straight or branched chain 7 to 18 C alkyl group and x is a number from 2 to 10;

(iv) a compound of the formula IV

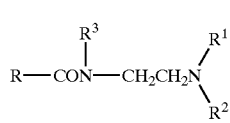  (IV)

in which R is a straight or branched chain 7–18 C alkyl group; $R^1$ is —CH$_2$CH$_2$OH or —(CH$_2$)$_x$—COONa, where x is 1 or 2, $R^2$ is (CH$_2$)$_y$COONa, where y is 1 or 2; and $R^3$ is H or —CH$_2$CH$_2$OH; and (v) an alkyl betaine of the formula V

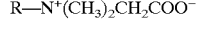  (V)

wherein R is a straight or branched chain 7 to 18 C alkyl group;

(D) a compound having the general formula VI

  (VI)

wherein R is a straight or branched chain 6–22 C alkyl or alkenyl or an alkylphenyl group; Z is O or NH; Q is —(CH$_2$)$_2$— or —(CH$_2$)$_3$— or a combination thereof; n is such that the Hydrophilic Lipophilic Balance (HLB) of the molecule will be 7.3 to 15.0.

It has been found that the incorporation of a compound having the formula (I) to (V), with a compound of the formula (VI) in association with one or more alkoxy ether solvents and a low molecular weight alcohol improves penetration of the water through emulsion type paint, including vinyl silk, and into the body of the plaster type interior textured coating residues leading to fast and thorough removal of these residues. Preferably, a compound having the formula I will be incorporated and also, preferably a compound having the formula II. After application of a preparation according to this invention, the softened, hydrated plaster type interior textured coating can easily be removed by hand, using a scraper.

The one or more alkoxy ether solvents will typically be present in the composition of the invention in an amount of up to 90%, preferably from 6 to 25%, by weight based on the weight of the composition. The alkoxy ether solvent will usually comprise the main plaster type interior textured coating removing solvent in the composition. It is possible, however, that part of the alkoxy ether solvent content is replaced by one or more other cleaning or coupling solvents. Typical of the alkoxy ether solvents that can be used in the present invention are 1–18C alkyl (preferably 1 to 6C alkyl) monoethers of (poly)ethylene glycol, (poly) propylene glycol and (poly) butylene glycol. For reasons of health and safety, the preferred alkoxy ether solvent will be a propylene glycol ether, such as the methyl monoether of dipropylene glycol.

The composition of the invention also comprises a straight or branched chain alcohol containing from 1 to 6 carbon atoms. Preferably, the alcohol is a monohydric alcohol of the formula ROH, wherein R is a 1–5C alkyl group.

Isopropanol, methanol or ethanol are especially preferred examples of the alcohol used in association with the alkoxy ether solvent. Ethanol will be more preferred than methanol in view of its reduced toxicity. The alcohol will usually be used in an amount of up to 90% by weight, preferably from 0.1 to 25% by weight, based on the weight of the composition.

Softening and hydration of the emulsion or vinyl silk painted surface of the plaster type interior textured coating residue is accomplished by the alkoxy ether solvent with the low molecular weight alcohol in combination with a compound of formula (I) to (V) and a compound of formula (VI). Improved penetration of the alkoxy ether through the thickness of the plaster type interior textured coating residues can be achieved by the incorporation into the composition of a compound having a formula (I) or(II) together with a compound having the formula (VI) above.

In the composition of the invention at least one nitrogen-containing surfactant compound of the formula (I) to (V) will be used.

The compounds of the formula I are as follows:

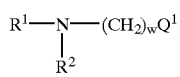  (I)

wherein $R^1$ is H or a group of the formula

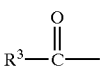

where $R^3$ is a straight or branched chain 6–22 C alkyl or alkenyl group; $R^2$ is H, or methyl or ethyl; w is 1 or 2; and $Q^1$ is —$COOM^1$ or —$SO_3M^1$, in which $M^1$ is an alkali metal cation or an optionally substituted ammonium group;

In the general formula I above the group $R^1$ may be H or an aliphatic acyl group of the formula

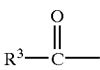

An example of a compound wherein $R^1$ is H is sodium sarcosine, i.e., the sodium salt of N-methylglycine. Preferably, however, the compound of formula I will be an alkali metal or ammonium salt of the reaction product of a 6 to 22 C alkanoic or alkenoic acid with an amino carboxylic acid or amino sulphonic acid. Examples of such 6 to 22 C acids include the fatty acids lauric acid, myristic acid, palmitic acid, stearic acid and oleic acid. In formula I, $R^2$ is H, methyl or ethyl. $R^2$ preferably, however, is a methyl group. The group $Q^1$ is a carboxylate or sulphonate in salt form where the cation is provided by an alkali metal, such as lithium, sodium or potassium or by an ammonium ion or a substituted ammonium ion, —NR'R"R'", where each of R',R" and R'" is independently selected from H, 1–6C alkyl or 2–6C hydroxyalkyl, provided that at least one of R',R" and R'" is not H, for example monoisopropylammonium ion, monoethanolammonium ion, diethanolammonium ion or triethanolammonium ion. Preferred examples of compounds having the formula I include sodium N-lauroylsarcosinate, sodium N-oleoylsarcosinate and sodium N-lauroyltaurinate. The compound having the formula I above is typically present in the composition in an amount from 0 to 25% by weight, preferably 0.1 to 15.0% by weight, based on the weight of the composition.

The compounds of the formula II are as follows:

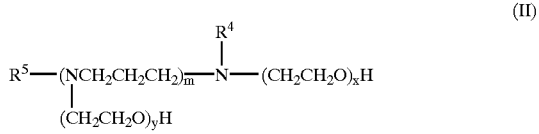  (II)

wherein $R^4$ is H or —$(CH_2CH_2O)_z$—H; $R^5$ is a straight or branched chain 6–22 C alkyl or alkenyl group; m is 0 or 1; and each of x, y, and z is an integer wherein the total number of ($CH_2CH_2O$) groups is in the range of from 2 to 50.

The compounds of the general formula II are ethoxylated amines. Their surfactant behaviour ranges from cationic, where the degree of ethoxylation is low, to nonionic where the degree of ethoxylation is high. A detailed description of such compounds can be found in "Surfactants UK 1979" by Dr Gordon Hollis, pp 129–131. Preferably, the compounds of the general formula II contain a group $R^5$ which is a straight chain 10–18C alkyl or 10–18C alkenyl group (a fatty alkyl or alkenyl group) and have a value for m of 0 and contain a total number of ethoxy (($CH_2CH_2O$) groups in the range of from 4 to 10, especially about 5. An example of such a compound is ethoxylated oleylamine. The ethoxylated amine will, in general, be used in the composition of the invention in an amount of not greater than 25% by weight.

Examples of such compounds are as follows, wherein $R^5$ is the aliphatic group derived from the indicated fatty amine:

| Fatty amine (Source of $R^5$) | x + y + z number | HLB |
|---|---|---|
| Coconut amine | 2 | 6 |
| Tallow amine | 5 | 14 |
| Stearyl amine | 25 | >17 |

The compounds of the formula III are imidazoline type surfactants.

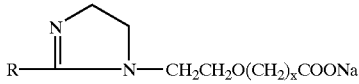

(III)

wherein R is a straight or branched chain 7 to 18 C alkyl group and x is 2 to 10. Preferably R is an n-heptyl group and x is 2.

The composition of the present invention may include as the, or one of the, nitrogen-containing surfactant part of the composition a compound of the formula IV

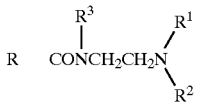

(IV)

in which R is a straight or branched chain 7–18 C alkyl group; $R^1$ is a group selected from —$CH_2CH_2OH$ and —$(CH_2)_x$COONa, where x is 1 or 2, $R^2$ is a group —$(CH_2)_y$COONa, where y is 1 or 2; and $R^3$ is H or —$CH_2CH_2OH$. Preferably the alkyl group R will be a straight chain group to improve the biodegradable properties of the compound. Examples of compounds of the formula IV include sodium cocoamphoacetate (IV, R is coco alkyl (i.e., 12–14 C alkyl), $R^1$ is $CH_2CH_2OH$, $R^2$ is—$CH_2COONa$ and $R^3$ is —$CH_2CH_2OH$), disodium cocoamphodiacetate (IV, R is coco alkyl, $R^1$ and $R^2$ are both —$CH_2COONa$ and $R^3$ is —$CH_2CH_2OH$), disodium cocoamphodipropionate (IV, R is coco alkyl, $R^1$ and $R^2$ are both —$CH_2CH_2COONa$ and $R^3$ is $CH_2CH_2OH$) and sodium capryloamphopropionate (IV, R is a capryl group, $R^1$ is —$CH_2CH_2OH$, $R^2$ is —$CH_2CH_2COONa$ and $R^3$ is H). Preferably, the compound of formula IV is sodium capryloamphopropionate.

The nitrogen-containing surfactant used in the composition of the invention may be a betaine of the formula (V)

$$RN^+(CH_3)_2CH_2COO^-$$ (V)

wherein R is a straight or branched chain 7–18 C alkyl group, although a straight chain alkyl group is preferred since these have greater biodegradability than branched chain groups. Preferably the R group is a 12–14 C straight chain alkyl group.

In addition to at least one of the nitrogen-containing compounds above the composition will contain at least one compound of the formula VI $$RZ(QO)_nH$$ (VI)

wherein R is a straight or branched chain 6–22 C alkyl or alkenyl or an alkylphenyl group; Z is O or NH; Q is —$(CH_2)_2$— or —$(CH_2)_3$— or a combination thereof; n is such that the Hydrophilic Lipophilic Balance (HLB) of the molecule will be 7.3 to 15.0.

For reasons of biodegradability, the preferred form of Q will be —$(CH_2)_2$—. Compounds of the general formula V are sometimes described as nonionic surfactants. These are usually represented as $$R^7Z(CH_2CH_2O)_nH$$

wherein Z is as defined above and $R^7$, the hydrophobe, may be nonylphenyl, a fatty alkyl or alkenyl group and n is the average number of moles of ethylene oxide per mole of $R^7$. By varying the "n" number and the nature of $R^7$ a wide variety of surfactant and physical properties, such as the Hydrophilic and Lipophilic Balance (HLB) may be obtained. For example:

| Hydrophobe ($R^7$ group) | "n" number | HLB |
|---|---|---|
| nonylphenyl | 4 | 8.9 |
| nonylphenyl | 9 | 12.8 |
| nonylphenyl | 12 | 13.9 |
| tridecyl | 3 | 8.0 |
| tridecyl | 5 | 10.5 |
| tridecyl | 10 | 13.7 |
| tridecyl | 20 | 16.3 |
| Synthetic C12–13 alkyl | 4 | 9.4 |
| Synthetic C12–15 alkyl | 3 | 7.8 |

N.B. for reasons of biodegradability, the preferred form of $R^7$ will be a straight 6–22 C alkyl or alkenyl chain.

Compounds of the general formula VI are alkoxylates. A detailed description of such compounds can be found in "Surfactants UK 1979" by Dr Gordon Hollis, pp 100–135 and p 245. R may be a straight or branched chain 6–22 C alkyl or 6–22 C alkenyl or an alkylphenyl group wherein the alkyl group is a straight or branched chain 6–22 C alkyl. An example wherein R is an alkylphenyl group is

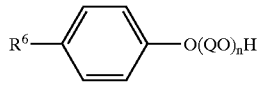

wherein $R^6$ is a straight or branched chain 6–22 C alkyl group and Q is —$(CH_2)_2$— or —$(CH_2)_3$—. An example wherein R is derived from a 12–15 C synthetic alcohol and the HLB of the molecule is 7.8 is $$R(OCH_2CH_2)_3OH$$

Preferably, the compounds of the general formula VI contain a group R which is a straight chain 10–20 C alkyl or alkenyl group (a fatty alkyl or alkenyl group) and have a value for n in the range of 3 to 15, especially about 7. An example of such a compound is ethoxylated cetyl/oleyl alcohol (16–18C). The ethoxylated alcohol will, in general, be used in the composition of the invention in an amount of not greater than 25% by weight.

We have found that improved penetration of pained plaster type interior textured coating residues can be achieved by using a composition which contains a blend of surfactants comprising a compound of the general formula I and a compound of the general formula VI. Instead of, or in addition to, the compound of formula I a compound of formula II may be used. This leads to easier, faster and more effective removal than has hitherto been available. Furthermore, the plaster type interior textured coating removing composition of the invention, after application to a coated substrate, gives rise to water-displaceable residues making it possible to clean the treated surface by washing with water after the greatest bulk of softened plaster type interior textured coating has been removed by a scraper. The water-displaceability of treated plaster type interior textured coating resides remaining after using the composition of the invention on a coated substrate can be improved by using a composition which contains at least one compound of the general formula II together with the compound of the general formula VI.

Other substances may also be incorporated into the plaster type interior textured coating removing composition of the invention. The plaster type interior textured coating removing composition may further contain one or more of waxes, corrosion inhibitors, thickeners, preservatives and additional solvents. The incorporation of a wax, e.g., paraffin wax or vegetable wax, has the effect of retarding evaporation from a layer of plaster type interior textured coating remover by forming a very fine skin over the applied layer. Typically, such a wax will be solid at ambient temperatures, i.e., will have a melting point of at least about 25C, and will be incorporated into the composition at a concentration of from 0.2 to 3.5% by weight based on the weight of the composition. One or more thickeners may also be used in the composition to improve its viscosity in order to facilitate the application of the composition to a coated substrate surface and to cause it to remain on a surface (e.g., vertical or overhead) to which it is applied. Such thickeners and the concentrations used, are known in the art. Other substances may also be incorporated into the plaster type interior textured coating remover composition of the invention. For instance, the action of the thickener may be improved by incorporating into the composition compounds having the general formula (VII)

$$R^8COOH \qquad VII$$

wherein $R^8$ is a straight or branched chain 6–22 C alkyl or alkenyl group; and/or a lithium, zinc, calcium, magnesium, aluminium, potassium, sodium, monoethanolammonium, diethanolammonium or triethanolammonium salt thereof. Typically, compounds of the general formula (VII) above will be incorporated into the composition at a concentration of from 0 to 7%, preferably 0.3 to 3% by weight based on the weight of the composition.

It has been found that the composition according to the present invention has use as an asbestos lagging rehydration agent to facilitate the removal, while suppressing dust creation, of asbestos fibre-containing coatings. In such uses the composition will not contain a thickener and may, advantageously, be diluted in water, for example 1 part of composition per 10 parts water to aid the wetting of the asbestos fibre-containing coating.

Furthermore, if it is intended to store or market the plaster type interior textured coating remover compositions of the invention in metal containers, the incorporation of one or more corrosion inhibitors in the composition may be preferred. Such inhibitors, which are known in the art, include as examples sodium metaborate and sodium nitrite.

Additionally, if it is intended to store or display or market the plaster type interior textured coating remover compositions of the invention over a prolonged period, the incorporation of one or more preservatives in the composition may be preferred. Such preservatives, which are known in the art, include as examples alkyl dimethyl benzyl ammonium hydrochloride, polyhexamethylene biguanide hydrochloride, chloromethylisothiazolinone and methylisothiazolinone.

A preferred plaster type interior textured coating remover composition according to the invention may be prepared by the following procedure.

Firstly, water is added to a mixing vessel and the temperature of the water is maintained at a value in the range of from 15° C. to 30° C. While stirring, the alkoxy ether is added slowly. The surfactant compound of formula I is added slowly and allowed to disperse into the contents of the vessel. Maintaining stirring, the surfactant compound of formula (VI) is added slowly and allowed to disperse into the contents of the vessel. Maintaining stirring, the chosen alcohol is added to the mixture and allowed to disperse into the contents of the vessel. In the event that a thickened plaster type interior textured coating remover composition is required, a thickener (.e.g. a modified cellulose type thickener) is preferably added to the contents of the vessel under constant stirring before the addition of the alcohol.

EXAMPLES

Example 1

A plaster type interior textured coating remover composition according to the invention has the following formulation.

| Ingredient | % by weight based on the weight of the composition |
|---|---|
| De-ionised water | 71.3 |
| methoxypropoxy propanol | 10.0 |
| sodium N-lauroyl sarcosinate | 1.0 |
| ethoxylated tridecanol having 7 moles ethylene oxide | 4.5 |
| Bermocoll PR (thickener) | 1.2 |
| Methanol | 12.0 |
| Total | 100.0 |

Performance Text 1

The plaster type interior textured coating remover composition having the formulation set out in Example 1 was tested on an area of plaster type interior textured coating which has been painted with emulsion type paint. The paint was known to be at least one year old. The plaster type interior textured coating, together with the paint, was sufficiently softened to be readily removed by scraping after a dwell time of approximately one minute.

Performance Test 2

"ARTEX" (Registered trade mark) powder and "ARTEX XL" (Registered trade mark) ready mixed were used as products to be removed. The powdered grade was made up into a slurry as per the instructions. These were applied to a substrate and allowed to dry thoroughly overnight before being treated with the remover composition. A dwell time of 2 to 5 minutes were evaluated. The plaster type interior textured coating remover composition having the formulation set out in Example 1 was tested. The two "ARTEX" products were sufficiently softened to be readily removed by scraping after being treated with the plaster type interior textured coating remover composition according to Example 1 above. A period of 3 to 5 minutes contact was required. One fine, smooth layer of textured coating, being approximately 1 mm thick required only 3 minutes contact before removal could be effected. Where a denser coat with a more pronounced, textured finish approximately 2 mm thick had been applied, this required a contact time of 5 minutes before removal could be effected.

Example 2

Test boards were prepared using interior wall board as used in domestic dwellings. "ARTEX" (Registered trade mark) powdered plaster type interior textured coating was purchased and made up as per the instructions. A generous coat was applied to the wallboard and allowed to dry as per the instructions. A second generous coat was applied over the first and allowed to dry as per the instructions. In virtually all decorating situations, only one textured application would be used. Two coats were used in the preparation of the test boards so as to ensure a dense coating on which to evaluate the remover.

"JOHNSTONES" (Registered trade mark), a good quality, branded vinyl silk paint was used. Paint was applied to the dried, textured finish. Samples were prepared with 0, 1, 2, 3 and 4 coats of paint. All sample boards were treated with the plaster type interior textured coating remover composition according to Example 1 above. They were then test scraped and observed at 5 minute intervals. The results achieved are listed below.

Results 1 - Paint removal:

| NUMBER OF COATS OF PAINT | WAS PRODUCT ABLE TO ACHIEVE COMPLETE PAINT REMOVAL? | HOW MANY APPLICATIONS WERE REQUIRED TO ACHIEVE THIS? | WHAT WAS THE TOTAL CONTACT TIME REQUIRED? |
|---|---|---|---|
| 0 | — | — | — |
| 1 | YES | 1 | 5 MINUTES |
| 2 | YES | 1 | 10 MINUTES |
| 3 | YES | 1 | 15 MINUTES |
| 4 | YES | 1 | 20 MINUTES |

Results 2 - Removal of underlying "ARTEX":

| NUMBER OF COATS OF PAINT ORIGINALLY | WAS PRODUCT ABLE TO ACHIEVE COMPLETE "ARTEX" REMOVAL? | HOW MANY APPLICATIONS WERE REQUIRED TO ACHIEVE THIS? | WHAT WAS THE CONTACT TIME REQUIRED? |
|---|---|---|---|
| 0 | YES | 1 | 5 MINUTES |
| 1 | YES | 1 | 5 MINUTES |
| 2 | YES | 1 | 5 MINUTES |
| 3 | YES | 1 | 5 MINUTES |
| 4 | YES | 1 | 5 MINUTES |

Results 3 - Removal of underlying "ARTEX" and paint:

| NUMBER OF COATS OF PAINT | WAS PRODUCT ABLE TO ACHIEVE COMPLETE PAINT AND "ARTEX" REMOVAL? | HOW MANY APPLICATIONS WERE REQUIRED TO ACHIEVE THIS? | WHAT WAS THE TOTAL CONTACT TIME REQUIRED? |
|---|---|---|---|
| 0 | YES | 1 | 5 MINUTES |
| 1 | YES | 2 | 10 MINUTES |
| 2 | YES | 2 | 15 MINUTES |
| 3 | YES | 2 | 20 MINUTES |
| 4 | YES | 2 | 25 MINUTES |

N.B. In all cases the underlying wallboard remained undamaged.

"ARTEX" is the registered trade mark of BPB (UK) Limited.

What is claimed is:

1. A plaster type interior textured coating remover composition in the form of an aqueous solution comprising (A) at least one alkoxy ether solvent in an amount which does not exceed 90% by weight, based on the weight of the composition;

(B) 0.1 to 25% by weight of an alcohol containing from 1 to 6 carbon atoms;

(C) 0.1 to 20% by weight of a nitrogen-containing compound having the general formula I $$R^1\!-\!\underset{\underset{R^2}{|}}{N}\!-\!(CH_2)_w Q \qquad (I)$$

wherein $R^1$ is H or group of the formula

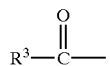

where $R^3$ is a straight or branched chain 6–22 C alkyl or alkenyl group; $R^2$ is H, or methyl or ethyl; w is 1 or 2; and $Q^1$ is —$COOM^1$ or —$SO_3M^1$, in which $M^1$ is an alkali metal cation or an optionally substituted ammonium group;

(D) optionally, at least one nitrogen-containing compound selected from (i) compounds having the general formula II

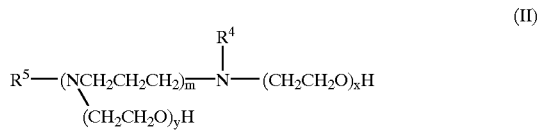

wherein $R^4$ is H or —$(CH_2CH_2O)_z$—H; $R^5$ is a straight or branched chain 6–22 C alkyl or alkenyl group; m is 0 or 1; and each of x, y, and z is an integer wherein the total number of ($CH_2CH_2O$) groups is in the range of from 2 to 50;

(ii) an imidazoline compound of the formula III

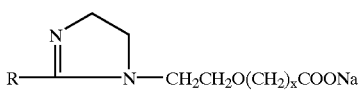  (III)

wherein R is a straight or branched chain 7 to 18 C alkyl group and x is a number from 2 to 10;

(iii) a compound of the formula IV

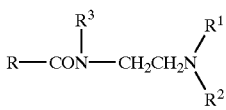  (IV)

in which R is a straight or branched chain 7–18 C alkyl group; $R^1$ is —$CH_2CH_2OH$ or —$(CH_2)_x$—COONa, where x is 1 or 2, $R^2$ is $(CH_2)_y$COONa, where y is 1 or 2; and $R^3$ is H or —$CH_2CH_2OH$; and (iv) an alkyl betaine of the formula V

R—$N^+(CH_3)_2CH_2COO^-$  (V)

wherein R is a straight or branched chain 7 to 18 C alkyl group; and (E) 0.1 to 20% by weight of a compound having the general formula VI $RZ(QO)_nH$  (VI)

wherein R is a straight or branched chain 6–22 C alkyl or alkenyl or an alkylphenyl group; Z is O or NH; Q is —$(CH_2)_2$— or —$(CH_2)_3$— or a combination thereof; n is such that the Hydrophilic Lipophilic Balance (HLB) of the molecule will be 7.3 to 15.0.

2. A composition according to claim 1, containing a compound of the general formula I which is an alkali metal salt or an optionally-substituted ammonium salt of the reaction product of a fatty acid selected from lauric acid, myristic acid, palmitic acid, stearic acid and oleic acid with an amino acid selected from glycine, N-methyl glycine and 2-aminoethane sulphonic acid.

3. A composition according to claim 2, wherein the compound of the general formula I is an alkali metal salt or an optionally substituted ammonium salt of N-lauroyl sarcosinate or N-lauroyltaurinate.

4. A composition according to claim 1, containing a compound of the general formula II in which $R^5$ is a straight or branched chain 10–22 C alkyl or alkenyl group, m is 0 wherein the total number of $(CH_2CH_2O)$ groups is in the range of from 4 to 10.

5. A composition according to claim 1, wherein the compound having the formula II is an ethoxylated oleylamine.

6. A composition according to claim 1 containing a compound of the general formula (VI) in which R is a straight or branched chain 6–22 C alkyl or alkenyl group, Q is —$CH_2CH_2$—, wherein the total number of $(CH_2CH_2O)$ groups is in the range of from 3 to 15.

7. A composition according to claim 1 containing a compound of the general formula (VI) in which R is a straight chain 6–22 C alkyl or alkenyl group, Q is —$CH_2CH_2$—, wherein the total number of $(CH_2CH_2O)$ groups is in the range of from 3 to 15.

8. A composition according to claim 1, wherein the alcohol is methanol or ethanol.

9. A composition according to claim 1, which additionally contains a compound of the general formula VII $R^8$—COOH  (VII)

wherein $R^8$ is a straight or branched chain 6–22 C alkyl or alkenyl group and/or a lithium, zinc, calcium, magnesium, aluminium, potassium, sodium, monoethanolammonium, diethanolammonium or triethanolammonium salt thereof.

10. A composition according to claim 9 wherein the compound having the formula (VII) is the sodium salt of a 14–18 C fatty acid.

11. A composition according to claim 9, wherein the compound having the formula (VII) is present in the composition at a concentration not greater than 3% by weight based on the weight of the composition.

12. A composition according to claim 5, wherein the compound of the general formula II is present at a concentration in the range of from 0.1 to 20.0% by weight based on the weight of the composition.

13. A composition according to claim 1, which additionally contains one or more members selected from the group consisting of wax and/or other evaporation retardants fragrance, corrosion inhibitors, preservatives, colouring agents and thickening agents.

14. A plaster type interior textured coating remover composition in the form of an aqueous solution comprising (A) at least one alkoxy ether solvent in an amount which does not exceed 90% by weight, based on the weight of the composition;

(B) 0.1 to 25% by weight of an alcohol containing from 1 to 6 carbon atoms;

(C) 0.1 to 20% by weight of a nitrogen-containing compound having the general formula I

  (I)

wherein $R^1$ is H or group of the formula

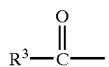

where $R^3$ is a straight or branched chain 6–22 C alkyl or alkenyl group; $R^2$ is H, or methyl or ethyl; w is 1 or 2; and $Q^1$ is —$COOM^1$ or —$SO_3M^1$, in which $M^1$ is an alkali metal cation or an optionally substituted ammonium group;

(D) optionally, at least one nitrogen-containing compound selected from (i) compounds having the general formula II

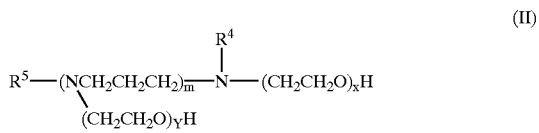  (II)

wherein $R^4$ is H or —$(CH_2CH_2O)_z$—H; $R^5$ is a straight or branched chain 6–22 C alkyl or alkenyl group; m is 0 or 1; and each of x, y, and z is an integer wherein the total number of ($CH_2CH_2O$) groups is in the range of from 2 to 50;

(ii) an imidazoline compound of the formula III

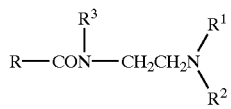  (III)

wherein R is a straight or branched chain 7 to 18 C alkyl group and x is a number from 2 to 10;

(iii) a compound of the formula IV

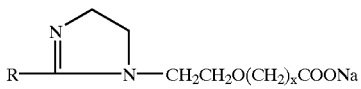  (IV)

in which R is a straight or branched chain 7–18 C alkyl group; $R^1$ is —$CH_2CH_2OH$ or —$(CH_2)_x$COONa, where x is 1 or 2, $R^2$ is $(CH_2)_y$COONa, where y is 1 or 2; and $R^3$ is H or —$CH_2CH_2OH$; and (iv) an alkyl betaine of the formula V

  (V)

wherein R is a straight or branched chain 7 to 18 C alkyl group;

(E) 0.1 to 20% by weight of a compound having the general formula VI

  (VI)

wherein R is a straight or branched chain 6–22 C alkyl or alkenyl or an alkylphenyl group; Z is O or NH; Q is —$(CH_2)_2$— or —$(CH_2)_3$— or a combination thereof; n is such that the Hydrophilic Lipophilic Balance (HLB) of the molecule will be 7.3 to 15.0; and (F) at least one thickener to increase the viscosity of the composition, whereby application of the composition to a surface is facilitated and whereby the length of time that the composition stays on a surface to which it is applied is increased.

* * * * *